United States Patent [19]

Augustin et al.

[11] 3,866,136

[45] Feb. 11, 1975

[54] AMPLIFIER PROTECTION CIRCUIT

[75] Inventors: Michael J. Augustin, Hoffman Estates; Wayne C. Kramer, Villa Park; Robert M. Treanor, Lake Zurich, all of Ill.

[73] Assignee: Motorola, Inc., Franklin Park, Ill.

[22] Filed: Apr. 23, 1973

[21] Appl. No.: 353,287

[52] U.S. Cl. .............. 330/207 P, 330/30 D, 330/24

[51] Int. Cl. .............................................. H03f 21/00

[58] Field of Search ................ 330/134, 135, 207 P; 307/202

[56] References Cited

UNITED STATES PATENTS

| | | | |
|---|---|---|---|
| 2,616,971 | 11/1952 | Kannenberg | 330/135 X |
| 3,156,834 | 11/1964 | Stillwell | 330/135 X |
| 3,320,533 | 5/1967 | Walters | 330/135 X |
| 3,382,461 | 5/1968 | Wolcott | 330/135 X |
| 3,641,451 | 2/1972 | Hollingsworth et al. | 330/134 |

*Primary Examiner*—Nathan Kaufman
*Attorney, Agent, or Firm*—Eugene A. Parsons; Vincent J. Rauner

[57] ABSTRACT

A protection circuit for a transmitter amplifier is provided which senses the forward power level and develops a first voltage which is compared with a reference voltage to provide a control voltage which controls the power developed by the transmitter amplifier. An increase in the forward power level is detected changing the control voltage to cause a reduction in the forward power developed by the transmitter amplifier. A decrease in forward power level is detected changing the control voltage to cause an increase in forward power developed by the transmitter amplifier. A forward power level below a predetermined level for a predetermined period of time is detected causing a reduction in the reference voltage. Reduction of the reference voltage reduces the control voltage to reduce or terminate the forward power of the transmitter amplifier. An excessive control voltage coupled to the transmitter amplifier is also detected increasing the first voltage which in turn causes a reduction in the control voltage thereby maintaining the control voltage below a preset level.

6 Claims, 1 Drawing Figure

PATENTED FEB 11 1975 3,866,136
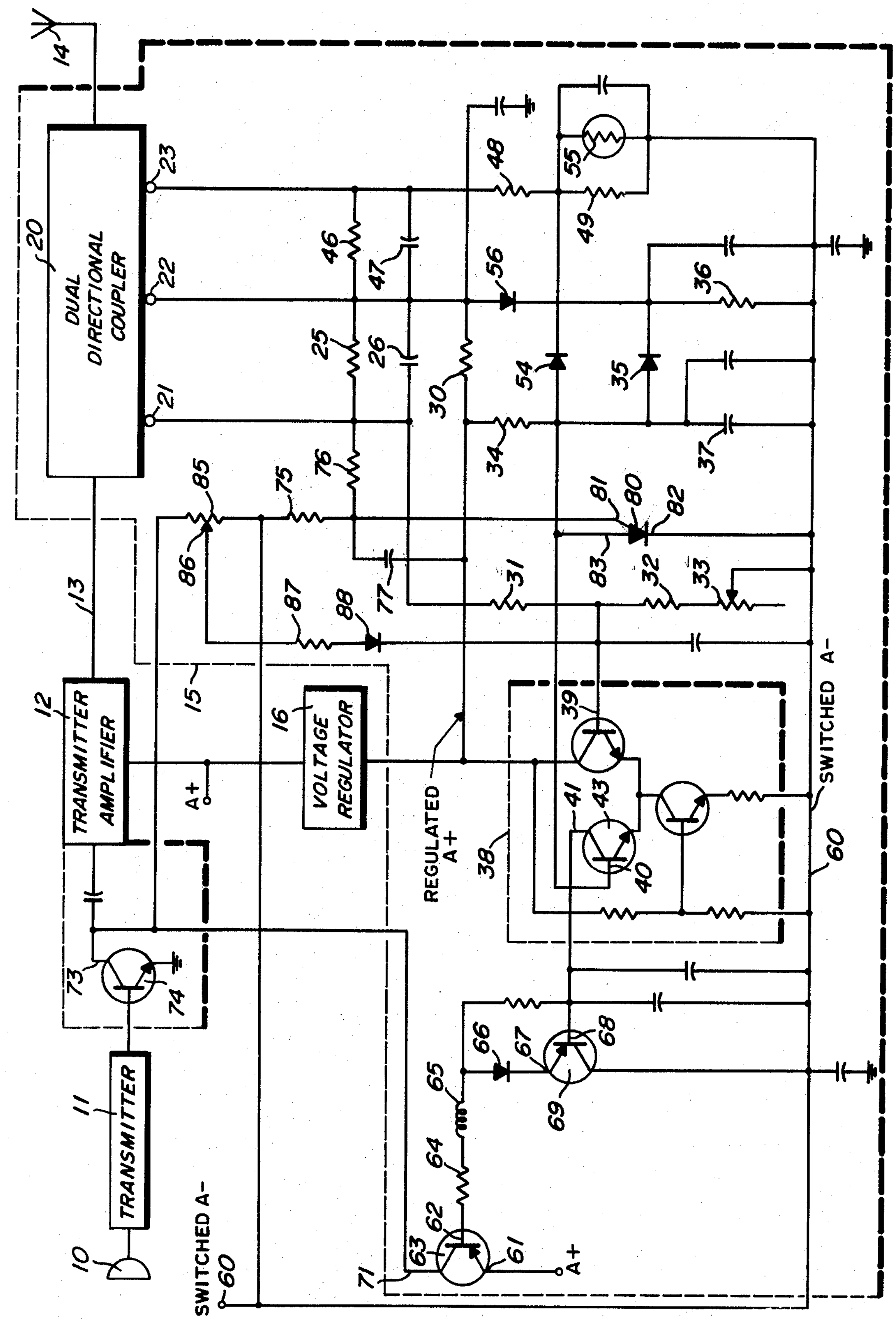

AMPLIFIER PROTECTION CIRCUIT

BACKGROUND OF THE INVENTION

Amplifier protection circuits currently employed, such as that described in U.S. Pat. No. 3,641,451, issued to Hollingsworth, et al., and assigned to the same assignee, provide protection by sensing the forward power level and developing a first voltage which is compared with a reference voltage to provide a control voltage which controls the power developed by the transmitter amplifier. Such circuits can also include reflected power sensing circuitry which senses an increase in reflected power and develops a second voltage which causes a reduction in the reference voltage and a resultant reduction in the control voltage, reducing the transmitter amplifier power to a safe level. It may further include temperature sensing circuitry which senses an increase in transmitter amplifier temperature beyond a predetermined level and causes a reduction in the reference voltage and a resulting reduction in the control voltage. In such a circuit, should the forward power decrease, the first voltage will decrease causing an increase in the control voltage coupled to the transmitter amplifier. Should the decrease in forward power be due to an open circuit between the transmitter amplifier and the forward power detecting circuit, the transmitter amplifier may be destroyed because of the control voltage causing an increase in power output when the transmitter amplifier is improperly terminated.

The transmitter amplifier may consist of a number of stages in series, with certain of the stages including two or more transistors operating in parallel or a push-pull configuration. In such amplifiers, it is possible that certain of the transistors become inoperative while the rest continue to operate in what appears to be a normal fashion. That is, the amplifier will still develop power at the output terminal which will be coupled through the power detection circuitry to an antenna. However, the power developed will be less than the desired power. As a consequence, the protection circuit will sense the lower forward power causing an increase in the first voltage which in turn causes an increase in the control voltage coupled to the transmitter amplifier. This increased control voltage will cause an increase in the power developed by the operating transistors. Because certain of the transistors remain inoperative, the power developed at the output of the amplifier will continue to remain below the desired power output resulting in continued increases in the control voltage. The operative transistors will continue to attempt to increase their power output. Because of the imbalance between the operative and inoperative transistors, the operative transistors will ultimately be destroyed.

SUMMARY OF THE INVENTION

It is, therefore, an object of this invention to provide a protection circuit for a transmitter amplifier which senses a reduction in forward power below a predetermined level for a predetermined period of time and causes a reduction in the control voltage for reducing or terminating the transmitter amplifier power output.

Another object of this invention is to provide a protection circuit for a transmitter amplifier which senses an excessive increase in control voltage to the amplifier and causes a reduction in this control voltage.

In practicing this invention, a protection circuit is provided for a transmitter amplifier which senses variations in forward and reflected power and variations in amplifier temperature and maintains the forward power at a safe level. A directional coupler coupled to the line between the transmitter amplifier output and the transmitter antenna senses the forward and reflected power level and develops forward and reflected power sensing signals which vary in accordance with variations in the forward and reflected power level. The forward power sensing circuit is coupled to a forward power detection circuit which develops a first voltage that varies in accordance with the forward power level. A bias circuit develops a reference voltage and the first voltage and reference voltage are coupled to a comparison circuit which develops a control voltage which varies in accordance with the difference between the first voltage and the reference voltage. The control voltage is coupled to the transmitter where it is used to bias a stage in the transmitter amplifier, thereby controlling the forward power developed by the amplifier. A time delay circuit coupled to the forward power detection circuit and to the comparison circuit senses forward power below a predetermined level for a predetermined period of time and causes a reduction in the reference voltage which in turn reduces the control voltage for reducing or terminating the power developed by the amplifier. A limit circuit coupled to a stage in the power amplifier senses an increase in the control voltage in excess of a predetermined level and increases the first voltage causing a resultant decrease in the control voltage, thereby maintaining the control voltage below a preset level. The reduced control voltage causes a reduction of the forward power developed by the transmitter amplifier.

BRIEF DESCRIPTION OF THE DRAWING

The single FIGURE is a combined schematic and block diagram of a radio transmitter and a transmitter amplifier protection circuit incorporating the features of this invention.

DETAILED DESCRIPTION

Referring to the drawing, audio signals received at Microphone 10 are coupled to transmitter 11 where they are processed in a manner well known in the art to become frequency modulated radio frequency (RF) signals. The frequency modulated RF signals are coupled to transmitter amplifier 12 where they are amplified to the desired RF power level, and coupled through conductor 13 to directional coupler 20. From coupler 20 the RF signals are coupled to antenna 14. Antenna 14 radiates the RF signal so that it can be picked up be desired receivers.

The RF power developed by transmitter amplifier 12 and coupled to antenna 14 is commonly termed "forward power." As transmitter amplifier 12 and antenna 14 are not electrically ideal elements, part of the forward power coupled to antenna 14 will be reflected back to amplifier 12. If antenna 14 should accidentially be broken or short circuited, all of the RF power developed by amplifier 12 will be coupled from antenna 14 back to amplifier 12. The RF signal reflected from the antenna 14 back to amplifier 12 is commonly termed "reflected power."

Forward power developed by amplifier 12 and reflected power coupled back to amplifier 12 are both coupled through directional coupler 20 in protection circuit 15. Directional coupler 20 in the preferred embodiment is a dual directional coupler which senses both forward and reflected power. It may, for example, be of the type disclosed in the above-noted Hollingsworth, et al patent, or it may be designed as a part of an RF circulator with diode detectors for developing voltages proportional to forward and reflected power. Coupler 20 develops a forward power voltage at 21, which varies in accordance with the forward power level. This voltage is positive with respect to common terminal 22. This forward power voltage at terminal 21 is coupled to one end of resistor 25. Resistors 30, 25, 31, 32 and potentiometer 33, coupled between voltage regulator 16 (regulated *a*+) and switched A− (terminal 60) form a bias circuit which develops an adjustable bias voltage at the junction of terminal 21 and resistor 25. The unmarked capacitor in parallel with resistor 32 and potentiometer 33 is an RF bypass capacitor as are all the unmarked capacitors in protection circuit 15. The forward power voltage at terminal 21 adds to this bias voltage developing a first voltage. The first voltage is coupled through resistor 31 to base 39 of differential amplifier 38.

Resistor 34, diode 35, resistor 36 and capacitor 37, coupled between voltage regulator 16 and switched A− (terminal 60), form a bias circuit which develops a reference voltage at the junction of resistor 34 and diode 35. The reference voltage is coupled to base 40 of differential amplifier 38.

When transmitter amplifier 12 is developing the desired forward power, potentiometer 33 is adjusted such that the reference voltage coupled to base 40 is greater than the first voltage coupled to base 39 by a predetermined amount. The voltage difference between base 40 and 39 will forward bias transistor 43 in differential amplifier 38. With transistor 43 forward biased, a current path will be completed from A+ at emitter 61 to base 62 of transistor 63, through resistor 64, RF choke 65, diode 66, emitter 67 and base 68 of emitter follower 69, to collector 41 of transistor 43. This current path will render transistors 63 and 69 conductive. The conductivity of transistors 63 and 69 will vary in accordance with the amount of current through the above-noted current path. The amount of current flow through transistors 63 and 69 is proportional to the difference in voltage at base 39 and base 40 of differential amplifier 38.

With transistor 63 conductive, a control voltage will be coupled from A+ potential at emitter 61 of transistor 63 to collector 71. This control voltage varies in accordance with the conductivity of transistor 63, and therefore, varies in accordance with the difference in voltage at base 39 and base 40 of differential amplifier 38. The control voltage will be coupled to collector electrode 73 of transistor 74 and transmitter amplifier 12, supplying the bias potential for this transistor. As the bias potential for transistor 74 determines the power developed by transistor 74, a variation in the bias potential or control voltage supplied to transistor 74 will cause a corresponding variation in the forward power developed by transistor 74, and a corresponding variation in the forward power developed by amplifier 12. An increase in the control voltage will cause an increase in the forward power developed by transistor 74 and the forward power developed by transmitter amplifier 12. A decrease in the control voltage will cause a decrease in the forward power developed by transistor 74 and transmitter amplifier 12.

Potentiometer 33 sets the voltage applied to base 39 of differential amplifier 38 to thereby adjust the difference in voltage between base 39 and base 40 such that a control voltage is developed which maintains the power developed by transmitter amplifier 12 at the desired level.

If the forward power developed by transmitter amplifier 12 should increase, as for example due to an increase in supply voltage, the first voltage developed at base 39 of differential amplifier 38 will increase, decreasing the voltage difference between base 39 and base 40. This decrease in voltage difference causes a decrease in control voltage. The reduced control voltage when coupled to transistor 74 in transmitter amplifier 12 will cause a reduction in the forward power developed by transmitter amplifier 12.

If the forward power developed by transmitter amplifier 12 should decrease, as for example due to a decrease in supply voltage, the first voltage developed at base 39 of differential amplifier 38 will decrease, increasing the voltage difference between base 39 and base 40 of differential amplifier 38. This increased voltage difference will cause an increase in control voltage. The increased control voltage when coupled to transistor 74 in transmitter amplifier 12 will cause an increase in the forward power developed by transmitter amplifier 12.

When transmitter amplifier 12 is energized by the application of supply voltage, care must be taken to prevent maximum control voltage from being applied thereto before protection circuit 15 has stabilized. Switched A− is applied to protection circuit 15 from terminal 60, to energize protection circuit 15. The switched A− causes capacitor 37 in the reference voltage bias circuit to slowly charge through resistor 34, causing the reference voltage coupled to base 40 of differential amplifier 38 to gradually increase from zero volts towards A+ potential. This causes the control voltage coupled to transmitter amplifier 12 to gradually increase, slowly increasing the power developed by transistor 74 in transmitter amplifier 12 until full power is developed. The time required for transmitter amplifier 12 to achieve full power is sufficient to allow protection circuit 15 to stabilize. A delayed power sensing circuit includes resistor 75, which has one terminal coupled to switched A− at terminal 60, and the other terminal coupled to one terminal of resistor 76. The other terminal of resistor 76 is coupled to the junction of coupler terminal 21 and resistor 25. Capacitor 77 is coupled from the junction of resistors 75 and 76 to A+ potential. A programmable unijunction transistor 80 has its gate electrode 81 coupled to the junction of resistors 75 and 76. Cathode 82 is coupled to switched A− potential, and anode 83 is coupled to base electrode 40 of transistor 43 in differential amplifier 38.

In operation, switched A− voltage is coupled from terminal 60 through resistor 75 to the junction of resistive dividers 75 and 76. The first voltage developed at the junction of coupler terminal 21 and resistor 25 is coupled to the junction of resistive dividers 75 and 76. The switched A− voltage and first voltage are summed at this junction. Should coupler 20 be detecting the correct forward power, the voltage developed at the junction of resistors 75 and 76 will be approximately the same as regulated A+ potential. In the preferred embodiment, this is approximately 9 volts. Capacitor 77 will, therefore, develop no voltage thereacross, because it is coupled from regulated A+ to the junction of resistors 75 and 76.

If cable 13, between transmitter amplifier 12 and dual directional coupler 20 is broken, the forward power detected by directional coupler 20 will decrease, causing a decrease in the first voltage developed at the junction of coupler terminal 21 and resistor 25. This decreased first voltage will cause a decrease in the voltage developed at the junction of resistive dividers 75 and 76. Initially, capacitor 77 will remain at A+ potential, however, it will begin to charge causing the voltage at the junction of resistive dividers 75 and 76 to decrease towards ground potential. Voltage divider resistors 75 and 76 and capacitor 77 form an integrator so that the rate of change in voltage across capacitor 77 will be determined by the values of resistors 75 and 76 and capacitor 77. The voltage developed at the junction of resistors 75 and 76 is coupled to gate electrode 81 of programmable unijunction transistor 80. When this voltage becomes less than the voltage developed across capacitor 37, as mentioned earlier in this application, programmable unijunction transistor 80 will fire causing conduction from anode 83 to cathode 82. This will couple base electrode 40 of transistor 43 in differential amplifier 38 to A− potential, rendering transistor 43 nonconductive. With transistor 43 nonconductive, a current path is no longer provided for transistors 63 and 69, thus terminating the control voltage coupled to collector 73 of transistor 74 and transmitter amplifier 12. The absence of a control voltage at collector electrode 73 will prevent transistor 74 from developing any forward power.

As previously mentioned, when transmitter amplifier 12 is energized by the application of supply voltage, care must be taken to prevent maximum control voltage from being applied thereto before protection circuit 15 has stabilized. This is accomplished by resistor 34 and capacitor 37 operating as an integrator to slowly develop a charge across capacitor 37. This slow charging of capacitor 37 causes the reference voltage coupled to base 40 of differential amplifier 38 to gradually increase from zero volts towards A+ potential. If when the transmitter amplifier 12 is initially energized, forward power is not developed and coupled to dual directional coupler 20, the correct first voltage will not be developed at the junction of coupler terminal 21 and resistor 25. A reduced first voltage will therefore be coupled to the junctions of resistors 75 and 76 causing a potential difference to exist across capacitor 77. Capacitor 77 will begin to charge causing the voltage at the junction of resistors 75 and 76 to decrease towards ground potential. The voltage at the junction of resistors 75 and 76 will then decrease towards zero volts while the voltage developed across capacitor 37 will increase towards 9 volts. When the voltage at the junction of resistors 75 and 76 decreases below the voltage developed across capacitor 37, programmable unijunction transistor 80 will fire decreasing the voltage at base 40 of transistor 43 in differential amplifier 38 to approximately A− potential. This also will render transistor 43 nonconductive, which in turn will render transistors 63 and 69 nonconductive. With transistor 63 nonconductive, control voltage will no longer be coupled to collector electrode 73 of transistor 74 in transistor amplifier 12.

In both the above-described cases, programmable unijunction transistor 80 is reset allowing protection circuit 15 to function in its normal manner, by removing A− potential. That is, the switched A− coupled to terminal 60 is removed. This terminates the current flow through programmable unijunction transistor 80, resetting it to a nonconductive condition.

A limit circuit is included in protection circuit 15 for protection against amplifier 12 being partially inoperative and developing a lower forward power than desired. The limit circuit includes a potentiometer 85 having a first terminal coupled to collector electrode 73 of transistor 74, and a second terminal coupled to switched A− potential, at terminal 60. The wiper arm or adjustable portion 86 of potentiometer 85 is coupled to one terminal of resistor 87. The second terminal of resistor 87 is coupled to the anode of diode 88. The cathode of diode 88 is coupled to base electrode 39 in differential amplifier 38.

In operation, potentiometer 85 is adjusted such that under normal operating conditions, diode 88 is reverse biased. Should the control voltage coupled to collector electrode 73 of transistor 74 exceed a predetermined level, this voltage will be coupled through potentiometer 85 and resistor 87 to diode 88 forward biasing diode 88. With diode 88 conductive, an increased potential is coupled to base electrode 39 in differential amplifier 38. This increased potential will sum with the first voltage, increasing the first voltage developed at base 39 of differential amplifier 38. With an increased first voltage at base 39 of differential amplifier 38, the voltage difference between base 39 and base 40 will decrease. This decrease in voltage difference causes a decrease in control voltage, thereby maintaining the control voltage below a preset level. The reduced control voltage when coupled to transistor 74 in transmitter amplifier 12 will cause a reduction in the forward power developed by transmitter amplifier 12, preventing overdissipation of the operative transistors.

Reflected power coupled from antenna 14 is sensed by directional coupler 20 which develops a reflected power voltage at terminal 23 which varies in accordance with the reflected power level. The reflected power voltage at terminal 23 is negative in sign with respect to 22. It is coupled to resistor 46 where it will substract from a bias voltage developed at the junction of coupler terminal 23 and resistor 46 to develop a second voltage. Resistors 30, 46, 48 and 49, coupled between voltage regulator 16 and switched A− (terminal 60), form the bias circuit which develops the bias voltage at terminal 23. The second voltage is coupled through resistor 48 to diode 54. Diode 54 constitutes one-half of a diode or gate consisting of diode 35 and diode 54.

With little or no reflected power sensed by directional coupler 20, the second voltage coupled to the junction of resistor 48 and diode 54 will be greater than the bias voltage developed at the junction of diode 35 and resistor 36. Diode 35 will be forward biased and diode 54 will be reverse biased. As the reflected power detected by directional coupler 20 increases, the second voltage at the junction of resistor 48 and diode 54 will decrease due to the negative reflected power voltage. When the reflected power exceeds a predetermined level, the second voltage at the junction of resistor 48 and diode 54 will become less than the bias at the junction of diode 35 and resistor 36, causing diode 54 to conduct and reverse biasing diode 35. As the reflected power increases further, the second voltage at the junction of resistors 48 and diode 54 will decrease further causing more current to flow through diode 54. The current flow through resistor 34 due to the conduction of diode 54 will reduce the reference voltage applied to base 40 of differential amplifier 38, decreasing the difference in voltage between base 39 and base 40 of differential amplifier 38. This decrease in voltage difference causes a decrease in the control voltage developed at collector 71 of transistor 63. The reduced control voltage when coupled to collector 73 of transistor 74, will cause a reduction in the forward power developed by transmitter amplifier 12, thereby preventing excessive power dissipation in amplifier 12 due to the increased reflected power. In the preferred embodiment a reflected power level equal to 11 percent of the desired power level will cause a reduction in the forward power developed by transmitter amplifier 12.

Increases in ambient temperature of amplifier 12 reduce its ability to withstand increased dissipation due to excessive forward or reflected power. To prevent damage to transmitter amplifier 12 when the ambient temperature rises, a temperature sensing circuit is added to amplifier protection circuit 15. Thermistor 55, coupled in parallel with resistor 49 is physically located adjacent to amplifier 12. As the ambient temperature of amplifier 12 increases, the resistance of thermistor 55 decreases causing the resistance of the parallel combination of resistor 49 and thermistor 55 to decrease. The decreased resistance decreases the bias voltage developed at the junction of coupler terminal 23 and resistor 46. With a lower bias voltage developed at the junction of coupler terminal 23 and resistor 46, a lower reflected power voltage will be required to develop a second voltage which will forward bias diode 54, and cause the reference voltage at base 40 of differential amplifier 38 to decrease. A lower reflected power will therefore be required to cause a reduction in the forward power developed by transmitter amplifier 12.

If the ambient temperature of amplifier 12 increases beyond a predetermined level, the second voltage will decrease, due to the decrease in bias voltage, to a level which will forward bias diode 54 with no reflected power present. The resulting decrease in reference voltage will decrease the forward power developed by amplifier 12. This prevents the desired forward power from damaging amplifier 12 when it is required to operate at an extremely high ambient temperature.

In the preferred embodiment, the temperature at which diode 54 will conduct with little or no reflected power present is 80° C. This temperature can be selected at any desired value.

Diodes 35 and 54 are necessary to control the reflected power level and temperature level at which the forward power is reduced. Variations in temperature will, however, cause the current and voltage characteristics of these diodes to vary thereby changing the reflected power level and temperature level necessary to reduce the forward power. Diode 56, coupled from the junction of resistor 30 and capacitor 26 to the junction of diode 35 and resistor 36, provides temperature compensation for diodes 35 and 54, thereby preventing change in temperature from affecting the reflected power level and temperature level necessary to reduce the forward power of transmitter amplifier 12.

As can be seen, an amplifier protection circuit for a transmitter amplifier has been provided which senses a reduction in forward power below a predetermined level for a predetermined period of time and causes a reduction in the control voltage for reducing or terminating the transmitter amplifier power output. The protection circuit also senses an excessive increase in control voltage to the amplifier and causes a reduction in this control voltage.

We claim:

1. A protection circuit for controlling the power of a transmitter amplifier which produces an output varying with a control signal applied thereto, said circuit including in combination: first circuit means coupled to the transmitter amplifier output for sensing the forward power coupled therefrom, said first circuit means developing a first signal which varies in accordance with the sensed forward power; bias circuit means for developing a second signal; signal comparing means coupled to said first circuit means and said bias circuit means for comparing said first and second signals, said signal comparing means developing a control signal which varies in accordance with the difference between said first and second signals, said signal comparing means being coupled to the transmitter amplifier for applying said control signals thereto to vary the power developed by the transmitter amplifier; and delayed power level sensing circuit means coupled to said first circuit means and said bias circuit means, said delayed circuit means being operative in response to said forward power being below a predetermined level for a predetermined period of time to reduce said second signal, said comparison means being operative in response to said reduced second signal to reduce said control signal for decreasing said transmitter amplifier power.

2. The protection circuit of claim 1 wherein said transmitter amplifier includes an amplifier stage having a power output which varies in accordance with said control signal, and further including limit circuit means coupled to said amplifier stage and said comparison means and responsive to said control signal exceeding a predetermined level to increase said first signal, said comparison means operative in response to said increased first signal to reduce said control signal whereby said control signal is maintained below a preset level.

3. The protection circuit of claim 2 wherein said delayed power level sensing circuit means includes time delay means coupled to said first circuit means and responsive to said forward power being below said predetermined level for said predetermined period of time to develop a delayed signal, and semiconductor means coupled to said time delay means and responsive to said delayed signal exceeding a second predetermined level to reduce said second reference signal.

4. The protection circuit of claim 3 wherein said time delay means is an integrator and said semiconductor means is a programmable unijunction transistor.

5. The protection circuit of claim 4 wherein said limit circuit means includes diode means being coupled to said amplifier stage and said comparison means, said diode means operative in response to said control signal exceeding said predetermined level to conduct and couple a control voltage to said comparison means for increasing said first signal.

6. A protection circuit for a transmitter amplifier which includes an amplifier stage having a power output which varies with a control signal applied thereto and operating when a supply voltage is applied thereto, said circuit including in combination: sensing means coupled to the output of the transmitter amplifier, said sensing means being responsive to forward power coupled therefrom to develop a forward power signal which varies in relation to said forward power, said sensing means further being responsive to reflected power coupled to the transmitter amplifier to develop a reflected power signal which varies in relation to said reflected power; first circuit means coupled to said sensing means and responsive to said forward power signal to develop a first signal which varies in relation to said forward power; bias circuit means for developing a reference signal; signal comparing means coupled to said first circuit means and to said bias circuit means, said signal comparing means being responsive to said reference signal and to said first signal to develop a control signal which varies in accordance with the difference between said reference signal and said first signal; means coupling said signal comparing means to the transmitter amplifier stage and applying said control signal thereto to control the power developed by said transmitter amplifier stage; temperature sensing means coupled to said bias means, said temperature sensing means sensing the temperature of said transmitter amplifier and having a characteristic varying in accordance with said temperature, said bias means being responsive to said temperature sensing means variations to vary said reference signal whereby the difference between said first signal and said reference signal changes; second circuit means coupled to said sensing means, said second circuit means being responsive to said reflected power signal to develop a second signal which varies in relation to said reflected power, said second circuit means being coupled to said bias circuit means, said bias circuit means being responsive to said second signal which reaches a predetermined value to vary said reference signal whereby the difference between said first signal and said reference signal changes; delayed power level sensing circuit means coupled to said first circuit means and to said bias circuit means, said delayed circuit means being operative in response to said forward power being below a predetermined level for a predetermined period of time to reduce said reference signal whereby the difference between said first signal and said reference signal is reduced; and limit circuit means coupled to said transmitter amplifier stage and said first circuit means and responsive to said control signal exceeding a predetermined level to increase said first signal whereby the difference between said first signal and said reference signal is decreased, said comparison means being operative in response to said decreased difference between said first signal and said reference signal to reduce said control signal for decreasing said transmitter amplifier stage power.

* * * * *